(12) United States Patent
Friedman et al.

(10) Patent No.: US 8,794,266 B1
(45) Date of Patent: Aug. 5, 2014

(54) CAM ACTUATED VALVE ASSEMBLY WITH MANUAL AND ELECTRIC ACTIVATION

(71) Applicant: Humphrey Products Company, Kalamazoo, MI (US)

(72) Inventors: Mark W. Friedman, Portage, MI (US); Robert A. Kracker, Baroda, MI (US)

(73) Assignee: Humphrey Products Company, Kalamazoo, MI (US)

( * ) Notice: Subject to any disclaimer, the term of this patent is extended or adjusted under 35 U.S.C. 154(b) by 22 days.

(21) Appl. No.: 13/655,066

(22) Filed: Oct. 18, 2012

Related U.S. Application Data

(60) Provisional application No. 61/548,505, filed on Oct. 18, 2011.

(51) Int. Cl.
*F16K 11/14* (2006.01)
*F16K 11/20* (2006.01)
*F16K 31/02* (2006.01)
*F16K 31/44* (2006.01)

(52) U.S. Cl.
USPC ...... 137/862; 137/595; 137/637; 251/129.03; 251/251

(58) Field of Classification Search
CPC ............ F16K 31/524; F16K 31/52408; F16K 31/52425; F16K 31/52475
USPC ......... 137/862, 637, 595, 861, 864, 870, 879, 137/881, 625.12, 628, 223; 251/129.03, 251/251, 262, 263, 256, 82, 83
See application file for complete search history.

(56) References Cited

U.S. PATENT DOCUMENTS

| | | | |
|---|---|---|---|
| 1,668,319 A * | 5/1928 | Kennedy | 74/1 R |
| 2,064,750 A | 12/1936 | Hurst | |
| 2,934,090 A | 4/1960 | Kenann et al. | |
| 3,027,134 A | 3/1962 | Nichols | |
| 3,172,637 A | 3/1965 | Adams et al. | |
| 3,427,988 A | 2/1969 | Redman et al. | |
| 3,510,103 A | 5/1970 | Carsello | |
| 3,521,851 A | 7/1970 | Sorrow | |
| 3,538,954 A | 11/1970 | Fagerlie | |
| 3,552,436 A * | 1/1971 | Stewart | 137/883 |
| 3,666,382 A | 5/1972 | Rasmussen | |
| 3,902,526 A | 9/1975 | Brake et al. | |
| 3,913,621 A * | 10/1975 | Damratowski | 137/630.2 |
| 4,021,153 A | 5/1977 | Cloup | |
| 4,026,325 A | 5/1977 | Loveless | |
| 4,066,101 A | 1/1978 | de Fries | |

(Continued)

FOREIGN PATENT DOCUMENTS

DE 2321100 4/1973

*Primary Examiner* — John Fox
*Assistant Examiner* — Michael R Reid
(74) *Attorney, Agent, or Firm* — Gardner, Linn, Burkhart & Flory, LLP

(57) ABSTRACT

A valve assembly for selectively enabling discharge of fluid includes a plurality of valves that are selectively moveable between a closed position and an open position and a cam that selectively actuates the valves. The cam is moveable between a first position in which fluid is sealed from discharge by the valves and a second position in which the valves are in the open position. An electrical actuator and a manual actuator are connected to the cam, with both the electrical actuator and the manual actuator being separately operable to move the cam into the second position upon actuation. The valve assembly may further include a housing within which the valves are disposed for movement.

27 Claims, 9 Drawing Sheets

(56) References Cited

U.S. PATENT DOCUMENTS

| | | | |
|---|---|---|---|
| 4,074,700 | A | 2/1978 | Engle |
| 4,100,519 | A | 7/1978 | Neff |
| 4,103,711 | A | 8/1978 | Arvin |
| 4,159,026 | A | 6/1979 | Williamson |
| 4,187,884 | A | 2/1980 | Loveless |
| 4,267,862 | A | 5/1981 | Neff et al. |
| 4,301,715 | A | 11/1981 | Acar |
| 4,376,618 | A | 3/1983 | Toyoda et al. |
| 4,382,452 | A | 5/1983 | Loveless |
| 4,442,998 | A | 4/1984 | Ohyama et al. |
| 4,485,846 | A | 12/1984 | Neff |
| 4,494,572 | A | 1/1985 | Loveless |
| 4,501,299 | A | 2/1985 | Klimowicz et al. |
| 4,524,807 | A | 6/1985 | Toliusis |
| 4,544,988 | A | 10/1985 | Hochstein |
| 4,566,490 | A | 1/1986 | Neff |
| 4,574,844 | A | 3/1986 | Neff et al. |
| 4,746,888 | A | 5/1988 | Ichihashi et al. |
| 4,799,276 | A * | 1/1989 | Kadish ............... 5/613 |
| 4,809,749 | A | 3/1989 | Ichihashi |
| 4,823,842 | A | 4/1989 | Toliusis |
| 4,842,020 | A | 6/1989 | Tinholt |
| 4,842,246 | A | 6/1989 | Floren et al. |
| 4,844,122 | A | 7/1989 | Ichihashi |
| 4,874,299 | A | 10/1989 | Lopez et al. |
| 4,887,430 | A | 12/1989 | Kroll et al. |
| 4,915,134 | A | 4/1990 | Toliusis et al. |
| 4,962,552 | A * | 10/1990 | Hasty ............... 5/713 |
| 4,971,114 | A | 11/1990 | Ichihashi et al. |
| 4,971,115 | A | 11/1990 | Tinholt |
| 4,973,024 | A | 11/1990 | Homma |
| 5,127,624 | A | 7/1992 | Domke |
| 5,144,813 | A | 9/1992 | Orner et al. |
| 5,211,198 | A | 5/1993 | Tinholt |
| 5,211,371 | A | 5/1993 | Coffee |
| 5,306,979 | A | 4/1994 | Schwarz, Jr. |
| 5,332,000 | A | 7/1994 | Gassner |
| 5,518,375 | A | 5/1996 | Vandromme et al. |
| 5,605,178 | A | 2/1997 | Jennins |
| 5,848,881 | A | 12/1998 | Frezza |
| 6,050,542 | A | 4/2000 | Johnson et al. |
| 6,105,931 | A | 8/2000 | Frank et al. |
| 6,133,816 | A | 10/2000 | Barnes et al. |
| 6,279,869 | B1 | 8/2001 | Olewicz |
| 6,404,098 | B1 | 6/2002 | Kayama et al. |
| 6,405,757 | B1 | 6/2002 | Jabcon |
| 6,488,050 | B1 | 12/2002 | Jabcon |
| 6,633,095 | B1 | 10/2003 | Swope et al. |
| 6,742,761 | B2 | 6/2004 | Johnson et al. |
| 6,843,465 | B1 | 1/2005 | Scott |
| 6,916,159 | B2 | 7/2005 | Rush et al. |
| 7,260,932 | B1 | 8/2007 | Klimowicz |
| 7,331,616 | B2 | 2/2008 | Brei et al. |
| 7,377,758 | B2 | 5/2008 | Sallows et al. |
| 7,448,411 | B2 | 11/2008 | Friedman et al. |
| 7,723,896 | B2 | 5/2010 | Esashi et al. |
| 8,186,978 | B2 | 5/2012 | Tinholt et al. |
| 8,528,597 | B2 | 9/2013 | Friedman et al. |

* cited by examiner

CAM ACTUATED VALVE ASSEMBLY WITH MANUAL AND ELECTRIC ACTIVATION

CROSS REFERENCE TO RELATED APPLICATION

The present application claims priority of U.S. provisional application, Ser. No. 61/548,505 filed Oct. 18, 2011, which is hereby incorporated herein by reference in its entirety.

BACKGROUND AND FIELD OF THE INVENTION

The present invention is directed to a cam actuated valve assembly with manual and electric activation, and in particular a valve assembly for use in deflating multiple mattress bladders of a patient support.

Patient support mattresses used in care facilities may be constructed to include multiple bladders that are inflated with a fluid, such as air or a liquid, to provide compliant support to a patient positioned on the mattress. In certain conditions it is undesirable to have a patient on a compliant mattress, such as for example when a patient requires treatments in which it is required that the patient is rigidly supported. Thus, such patient support mattresses may be required to be deflated, and in particular that each of the bladders of the mattress be deflated. Patient support mattresses may also be deflated for removal or transportation of a patient.

SUMMARY OF THE INVENTION

The present invention provides a valve assembly having manual and electrical actuation for deflating multiple bladders within a patient support mattress.

According to an aspect of the present invention, a valve assembly for selectively enabling discharge of fluid comprises a plurality of valves, a cam that selectively actuates the valves, and both an electrical actuator and a manual actuator connected to the cam. The valves are selectively moveable between a closed position and an open position. The cam selectively actuates the valves, with the cam being moveable between a first position in which fluid is sealed from discharge by the valves and a second position in which the valves are in the open position. Both the electrical actuator and the manual actuator are separately operable to move the cam into the second position upon actuation. The opening of the valves with respect to one another may be staggered to limit the torque requirements on the electrical actuator.

The valve assembly may further include a housing within which the valves are disposed for movement, and may further include a plurality of valve actuating members that are engaged with separate ones of the valves with the cam acting on the valve actuating members when the cam moves for imparting an opening force to the valves, which actuating members may comprise steel balls or the like. In particular embodiments the housing includes actuating member bores within which the actuating members are disposed for axial movement relative to the actuating member bores. The cam may comprise a slide member mounted to the housing, with the cam sliding perpendicularly relative to the axial orientation of the actuating member bores.

According to still further aspects, the valve assembly may include multiple valve support members within which valve springs are supported on spring seats for providing a biasing force to the valves. The valve support members may be affixed to the housing and include a valve support bore providing fluid communication to separate ones of the valves. The valve support members may be affixed to a portion of the housing that is distally opposed from the cam. The valve assembly may comprise a three-way valve. The cam may include a plurality of cam surfaces for imparting opening forces to the valves when the cam is moved between the first position and the second position, including simultaneously opening the valves.

Each valve assembly may include a valve seat separating a pair of bores or passageways, with an additional valve seat being located within each valve body whereby the valve selectively seals against one or the other valve seat when moved between the first and second valve position.

A valve assembly in accordance with aspects of the present invention enables multiple bladders of a mattress to be rapidly and simultaneously deflated even at low pressures, with the valve being either manually or electrically actuated for deflation. The valve assembly may be used to rapidly deflate a mattress supporting a patient in the event it is undesirable to have the patient on a cushioning surface.

These and other objects, advantages, purposes and features of this invention will become apparent upon review of the following specification in conjunction with the drawings.

DESCRIPTION OF THE PREFERRED EMBODIMENTS

Figure 1:
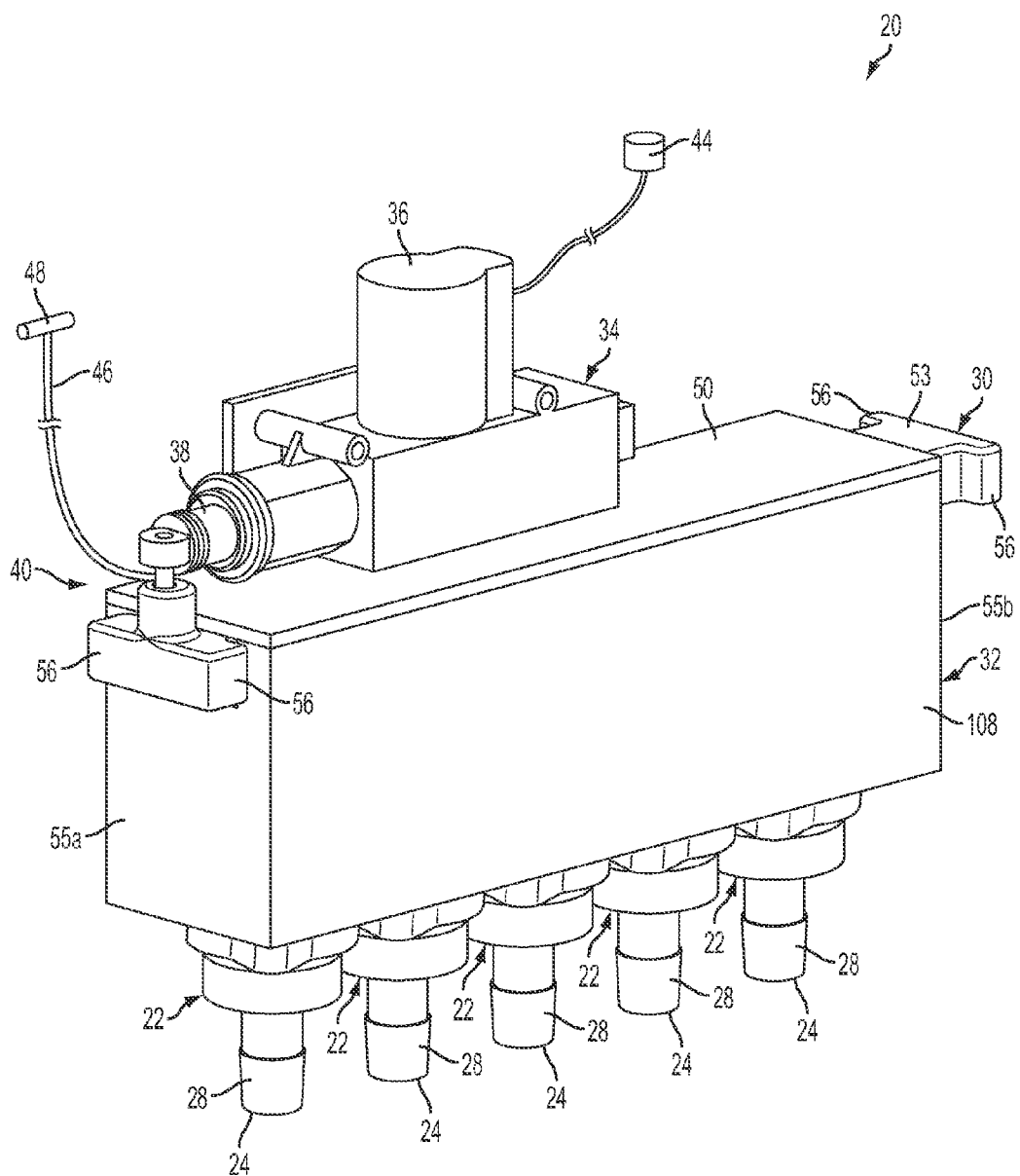
FIG. 1 is a perspective view of a cam actuated valve assembly with manual and electric activation in accordance with an aspect of the present invention.
Figure 1A:
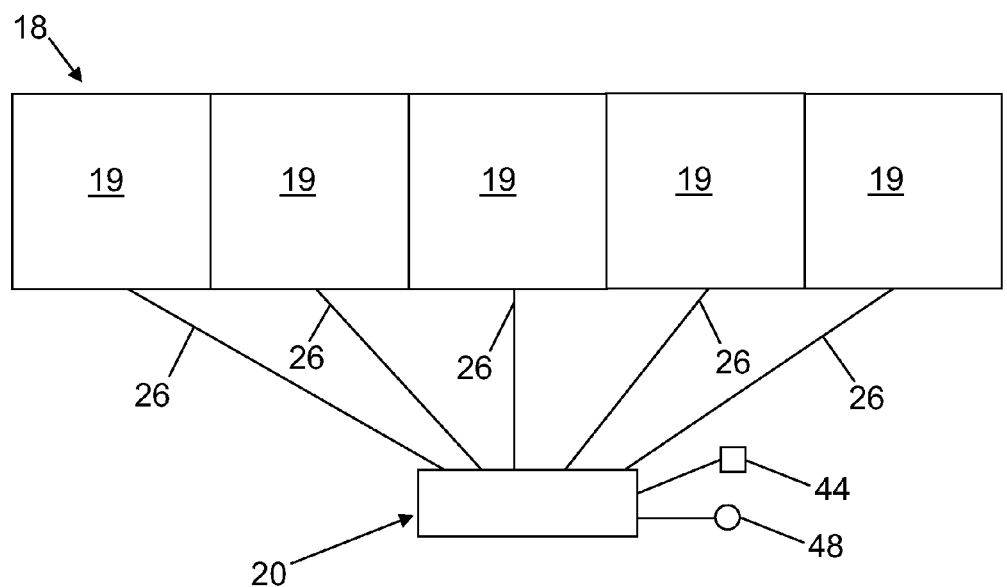
FIG. 1A is a side elevation view of a patient support mattress operatively connected with the valve assembly of FIG. 1.
Figure 2:
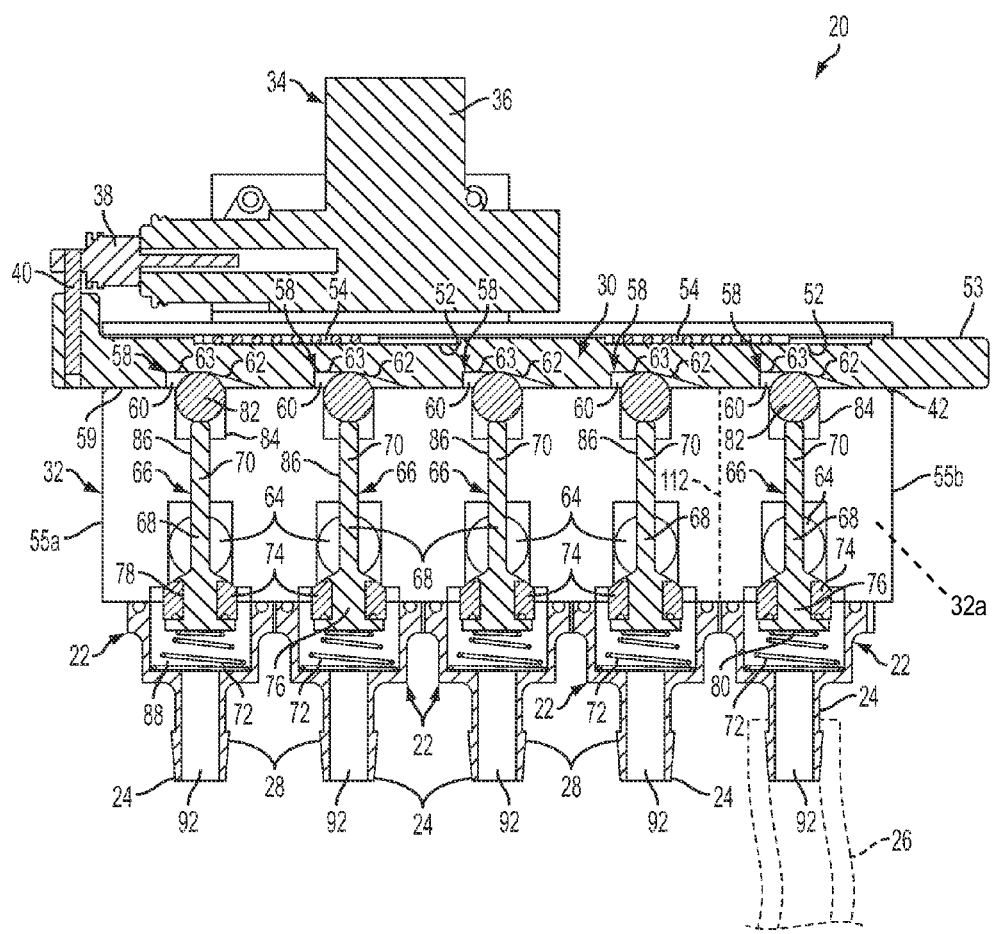
FIG. 2 is a side elevation cross sectional view of the valve assembly of FIG. 1.

The present invention will now be described with reference to the accompanying figures, wherein the numbered elements in the following written description correspond to like-numbered elements in the figures. A valve assembly 20 in accordance with an embodiment of the present invention is illustrated in FIGS. 1 and 2 for use with a mattress having multiple bladders, such as a patient support mattress 18 having multiple bladders 19 for retaining fluid such as air or liquid. Valve assembly 20 is operable to enable the bladders 19 of the mattress 20 to be rapidly deflated even at low pressures, with the valve assembly 20 being either manually or electrically actuated for deflation. Valve assembly 20 may be used, for example, to rapidly deflate a mattress upon which a patient is positioned in the event medical procedures to the patient are required and for which it is undesirable to have the patient on a cushioning surface, such as in the event a patient requires cardiopulmonary resuscitation.

In the illustrated embodiment, valve assembly 20 includes five valve support members 22 that include integral connectors 24 for connecting to five separate bladders of a mattress, such as by way of air lines 26 connecting to barbs 28 of connectors 24. Valve assembly 20 normally prevents air within the bladders from flowing out of valve assembly 20, and upon activation enables air to flow out of valve assembly 20 via action of a cam 30 that is mounted for sliding movement to a housing 32 of valve assembly 20. Valve support members 22 may be constructed of plastic or metallic materials and it should be understood that an alternative valve assembly may be constructed to include fewer than or more than five valve support members, such as based on the number of bladders within a mattress, and still operate in accordance with the present invention.

Cam 30 may be caused to move either by way of an electrical actuator 34 or by way of a manual actuator. Regarding electrical actuation, actuator 34 includes an electric motor 36 that, upon activation, causes a member or rack 38 to extend from the actuator 34. Rack 38 is connected to cam 30 by a connector or pin member 40 such that extension of rack 38 causes cam 30 to slide within a groove or channel 42 of housing 32. Motor 36 is activated by a switch, such as a button 44, that may be positioned about the patient support for access by a health care provider. Button 44 may be depressed to cause extension of member 38 and open valves 66, and subsequently depressed for retraction of member 38 to re-close valves 66. Manual actuation of cam 30 is enabled by a manual actuator that is also connected with cam 30, where in the illustrated embodiment the manual actuator comprises a cable 46 connected to pin member 40 at one end with the opposite end being positioned about the patient support for access by a health care provider. In the illustrated embodiment, for example, the opposite end of cable 46 includes a handle 48 for grasping and pulling cable 46, such as by a health care provider, whereby cam 30 is caused to move within or relative to housing 32. Manual opening of valves 66 may be performed, for example, when the patient support retaining mattress 18 is disconnected from power, such as when a wheeled patient support is being moved.

Cam 30 laterally slides within channel 42 of housing 32, with a cover member or plate 50 being disposed overtop cam 30 and housing 32 for retention of cam 30, with cover member 50 being retained in place against housing 32 by fasteners or the like (not shown). A pair of grooves 52 are included on an upper portion or surface 53 of cam 30 within which needle roller cage bearings 54 are disposed to facilitate or promote sliding movement of cam 30. Cam 30 also includes stops 56 on either end to limit the travel of cam 30, with stops 56 being formed in the illustrated embodiment as flared or extension portions on either end of cam 30 that abut against the respective sides 55a, 55b of housing 32 to limit the travel. Cam 30 further includes cam grooves 58 on a lower portion or surface 59 of cam 30 for imparting an opening force to valves 66, as discussed in more detail below, with cam grooves 58 including a groove or first surface or portion 63 defining a pocket or recess 60 and an angled cam surface or ramp 62.

Air is released from the bladders of a mattress through valve assembly 20 by being discharged through valve ports 64 in housing 32 by way of action of valves 66 that are caused to move by cam 30. In the illustrated embodiment, with further reference to FIG. 3, valves 66 comprise poppet valves, with each valve 66 including a valve stem 68 having a valve shaft 70, a valve spring 72, and a seating member 74 disposed about a lower portion 76 of valve stem 68. Lower portion 76 of valve stem includes an annular groove 78 for receiving seating member 74 and includes an enlarged spring surface 80 that is perpendicularly disposed relative to the axial orientation of valve shaft 70 and against which valve spring 72 imparts a biasing force. An actuating member, which in the illustrated embodiment comprises a steel ball 82, is further disposed in engagement with the opposite end of valve shaft 70, with housing 32 including actuator bores 84 that retain balls 82. Valve stems 68 moves within housing 32 by way of valve shafts 70 sliding within valve guide portions 86 of housing 32.

Valve springs 72 are retained within spring cavities 88 of valve support members 22, with valve support members 22 including annular spring seats 90 upon which valve springs 72 are supported for providing biasing force to valve stem 68. Spring cavities 88 have a larger cross sectional diameter relative to the passage 92 through connectors 24, thereby forming a shoulder to define spring seats 90. Each valve support member 22 further includes an o-ring groove 94 with an o-ring 96 disposed therein for sealing against an underside 98 of housing 32 when valve support members 22 are mounted to housing 32, such as by fasteners (not shown). Valve support members 22 may be formed together to create a unitary piece forming multiple valve support members, such as in the manner of a molded member.

Housing 32 includes valve seats or valve seat portions 100 against which each seating member 74 is normally disposed by way of the biasing force of springs 72 to prevent the discharging of air from bladders through ports 64. Valve seats 100 are defined by a circular or circumferential edge formed in housing by the intersection of a recess 102 with a bore 104, with recess 102 having a larger diameter than bore 104. As shown, bores 104 include ports 64 where ports 64 are formed by passageways 106 in housing 32 that intersect with bores 104 and, in the illustrated embodiment, form an opening on a side of housing, such as on the side opposite side 108 shown in FIG. 1. Seating members 74 may be constructed of a resilient material to aid in sealing against valve seats 100. Still further, seating members 74 may include an o-ring groove 73 and an o-ring 75 for sealing against lower portion 76 of valve stem 68 adjacent annular groove 78 opposite spring surface 80.

Figure 3:
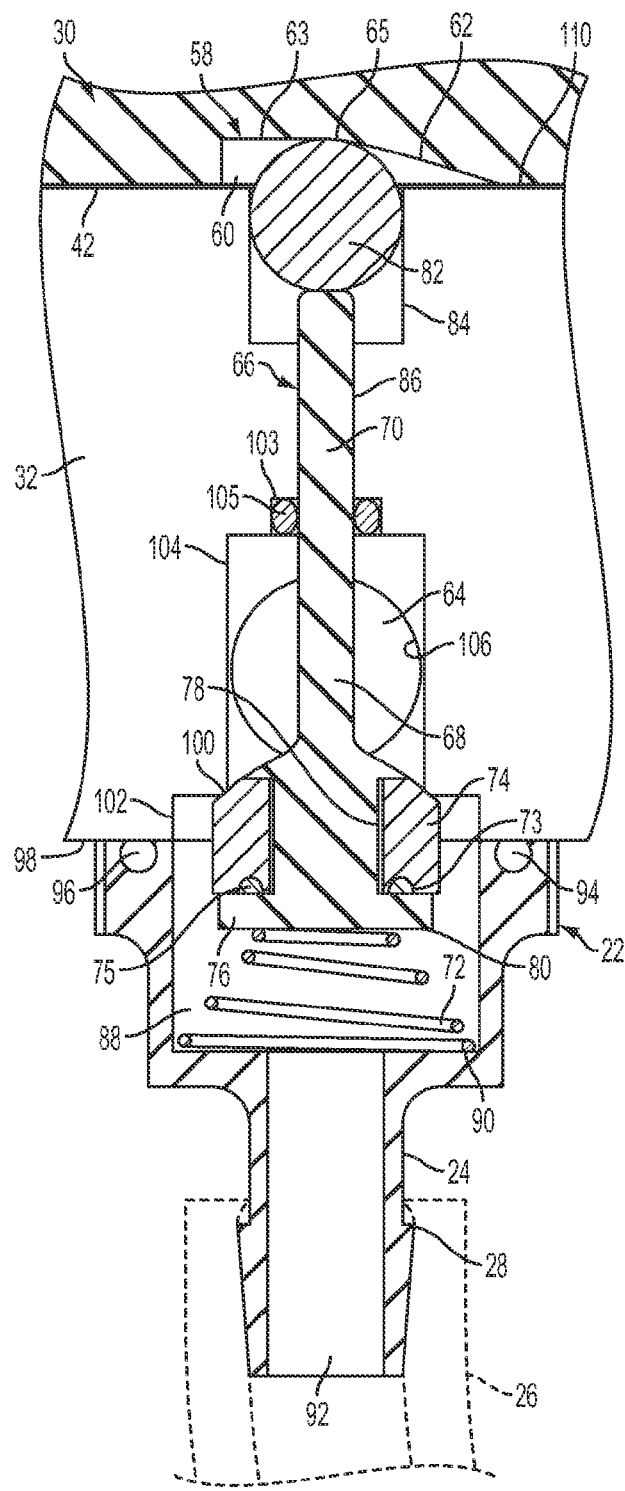
FIGS. 3 and 3A are partial close up views from FIG. 2 disclosing a valve contained within the housing of the valve assembly in a closed position in FIG. 3 and an open position in FIG. 3A.
Figure 3A:
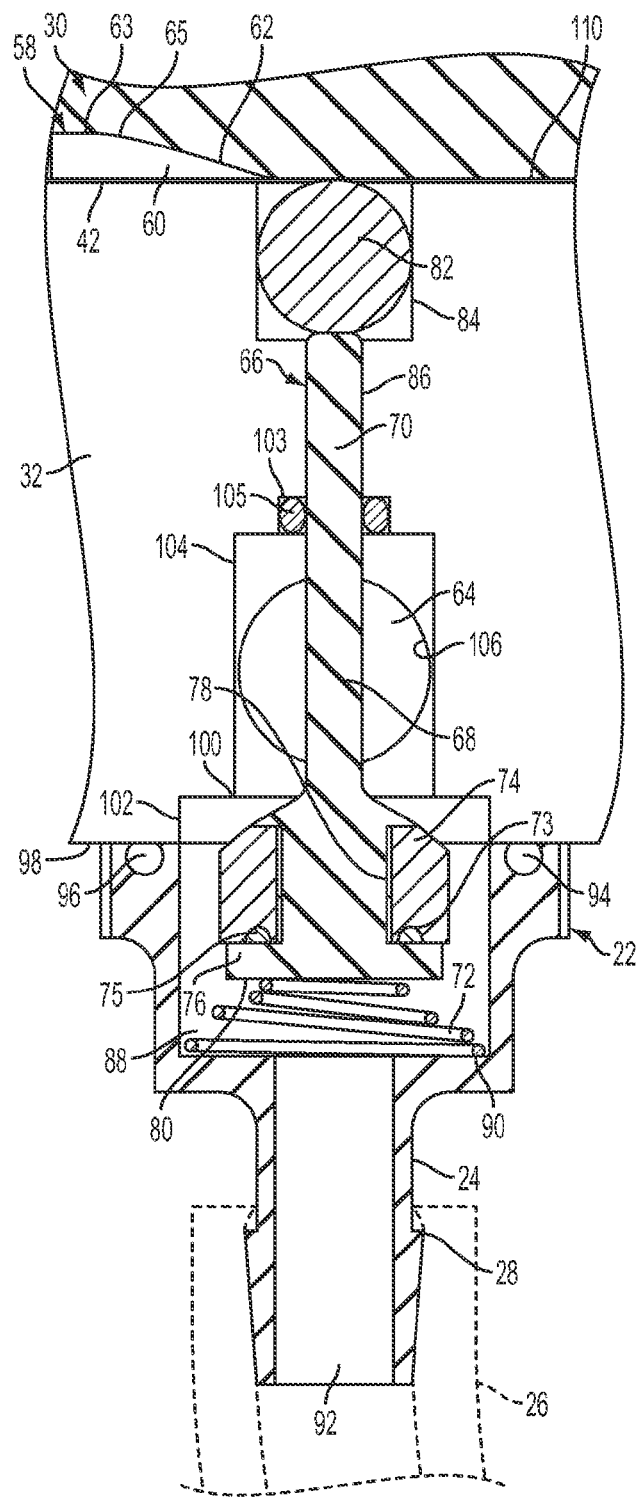

With further reference to FIG. 3, for sealing of each valve 66 an annulus or additional recess 103 may be included at or near the intersection of bores 104 and valve guides 86 for retention of a seal 105, which may be an o-ring or x-ring type seal for preventing the flow of fluid through guides 86. Based on tolerances between valve shaft 70 and valve guides 86 and/or working pressures of valve assembly 20, however, valve assembly 20 may not require such an additional seal.

In the illustrated embodiment, bores 84 for retaining balls 82 are sized to be of slightly larger diameter than balls 82 such that balls 82 may move in the axial direction of bores 84, but are constrained from substantial lateral movement with respect to the axial orientation of bores 84. When valves 66 are in their normally closed position to prevent air from being discharged through ports 64, as shown in FIG. 2, balls 82 are positioned within bores 84 such that more than half of each ball 82 is positioned within bore 84. That is, a plane separating the two hemispheres of ball 82 and oriented parallel with the sliding surface 110 of channel 42 is positioned within bore 84 below the surface 110.

When valves 66 are in their normally closed position and with cam 30 in a first position or closed position as illustrated in FIG. 2, a portion of balls 82 extend out of bores 84 and are positioned within recesses 60 of cam grooves 58 due to the biasing force of springs 72. The stack up of the balls 82 and valves 66 may be such that the surface of balls 82 opposite from the point of contact with valve stem 68 is in close proximity to surface 63 of cam 30. As understood from the illustrated embodiment, this point on balls 82 may be in close proximity with the transition from the surface 63 of recess 60 to the ramp surface 62 of cam grooves 58, where the transition defines a valve activation location or transition portion 65 of surface 62 (see FIG. 3).

Upon either manual or electrical activation of valve assembly 20 in the manner discussed above to cause cam 30 to move into a second or open position, which relative to the view of FIG. 2 would be to the left, valves 66 are actuated into an open orientation to allow air to escape there through. Movement of cam 30 into the open position causes ramps 62 of cam grooves 58 to apply a downward force to balls 82 against the biasing force of springs 72, which in turn imparts a downward force to valve stem 68 causing seating member 74 to be displaced from valve seats 100, thus allowing air to escape past valve seats 100 and out of ports 64. Valves 66 may be constructed to enable sufficient movement of cam 30 whereby balls 82 ride completely down ramps 62 and into engagement with the bottom surface 59 of cam 30 when cam 30 is moved into the open position. In such an embodiment, bores 84 are at least as deep as the diameter of balls 82.

An alternative valve assembly may comprise a modular valve assembly employing individual valve bodies for each valve 66. For example, rather than utilizing a unitary housing 32, each valve 66 may be retained in a separate body, with each body including various structures corresponding to the structures of housing 32 for enabling operation of such a modular valve assembly. Such structure may include features corresponding to the valve port 64, bore 84, valve guide 86, recess 102, valve seat 100 and passageway 106 of housing 32. With reference to FIG. 2, line 112 illustrates how a separate body 32a may be employed. Such a modular valve assembly may then be constructed to include the number of bodies necessary for a given application, with the bodies being assembled together such as being individually connected to a cover, such as a cover plate 50, or with the individual bodies being interconnected together, such as by fasteners or clips or the like. Like housing 32, the individual bodies may be constructed of plastic or metallic materials. Although discussed above in connection with air, it should be appreciated that a valve assembly in accordance with the present invention may also be employed for use with alternative fluids, including liquid fluids. Still further, although discussed in connection with a multi-bladder mattress application, it should also be appreciated that a valve assembly in accordance with the present invention may be utilized in alternative applications and/or environments.

Figure 4:
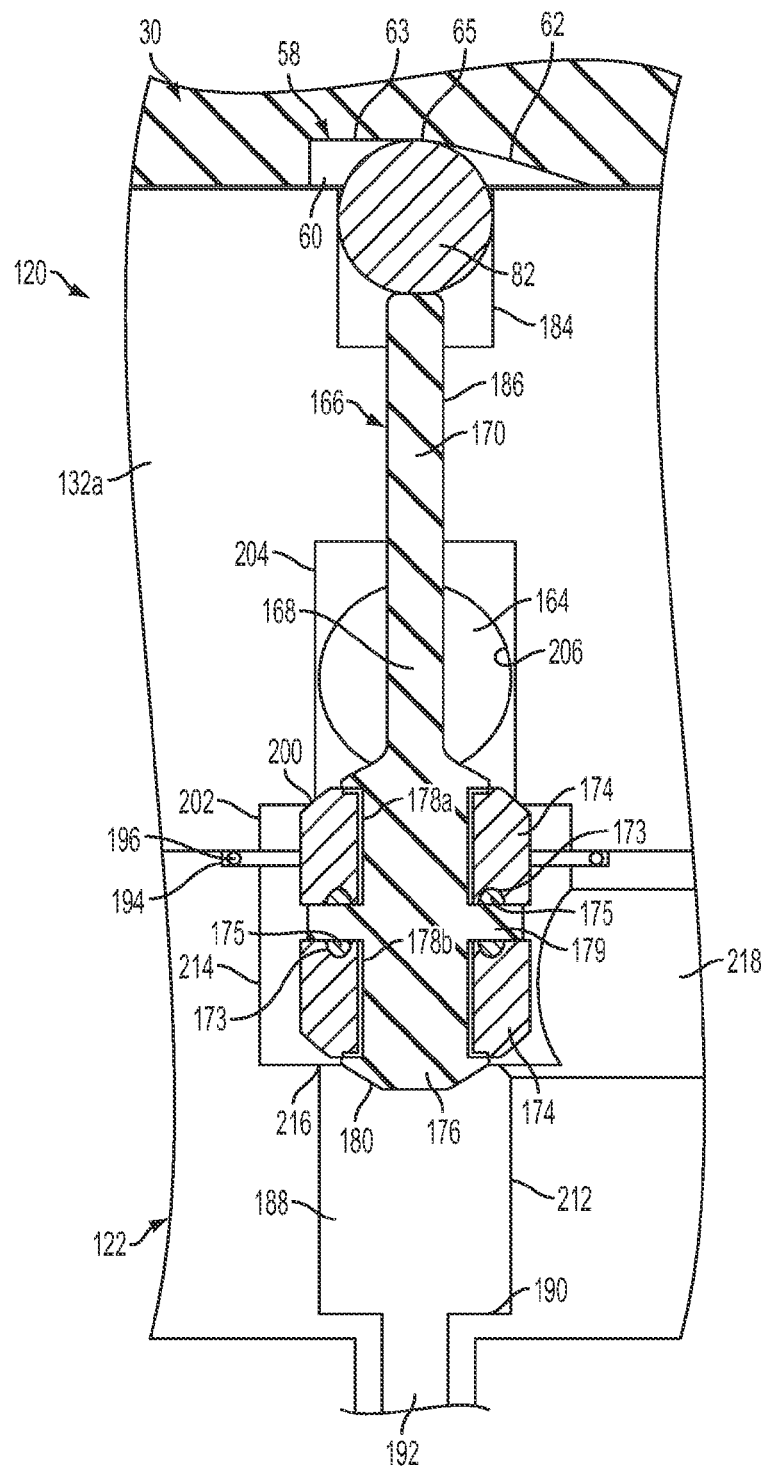
FIG. 4 is a partial close up sectional view of a three-way valve of an alternative cam actuated valve assembly with manual and electric activation in accordance with an embodiment of the present invention.

Referring now to FIG. 4, an alternative valve assembly 120 in accordance with the present invention may include a three-way valve, such as valve 166 shown. Valve assembly 120 is similar to valve assembly 20 discussed above, with like elements being shown in FIG. 4 with 100 added to the reference numerals of FIGS. 1-3. Due to the similarities, not all of the corresponding features or aspects of valve assembly 120 are discussed herein.

Valve assembly 120, which is partially shown in FIG. 4 illustrating a single body 132a with a single valve 166 therein, may comprise multiple interconnected bodies 132a, each of which supports a separate valve 166. Alternatively, however, valve assembly 120 may be constructed to comprise a single housing, such as housing 32 discussed above supporting multiple valves 166. As shown, valve assembly 120 includes a valve support member 122 connected to body 132a, which may be constructed of plastic or metallic material, and also includes a cam 30, partially shown in FIG. 4, distally connected to body 132a.

Body 132a includes a first or upper bore 184, valve guide 186, a second or lower bore 204 having a port 164 interconnected therewith via passageway 206, and includes a recess 202 intersecting with bore 204 to form a first or upper valve seat 200. Valve support member 122 includes a spring cavity 188 within which a spring (not shown) may be retained for providing a biasing force to valve 166, as discussed in detail below, with the spring being supported on a spring seat 190 and contacting the underside of valve 166. Spring cavity 188 of valve support member 122 is formed by a bore 212, with bore 212 intersecting an upper bore 214 having a larger diameter such that a second or lower valve seat 216 is formed between bores 212, 214. Valve support member 122 further includes a passageway 192 intersecting or formed by bore 212, and a second passageway 218 intersecting bore 214 above valve seat 216. Although passageway 218 is illustrated in FIG. 4 as opening to the right, it should be appreciated that passageway 218 may be alternatively oriented, such as being offset 90 degrees to open into or out of valve support member 122 relative to the view shown in FIG. 4. Valve support member 122 may further include a seal ring groove or recess 194 within which a seal ring 196 may be retained for sealing between valve support member 122 and valve body 132a.

Valve 166 includes a valve stem 168 having a valve shaft 170 and a lower portion 176, with lower portion 176 including an upper annular groove 178a and a lower annular groove 178b, with grooves 178a and 178b being separated by a web portion 179. Upper and lower sealing members 174 are positioned within each groove 178a, 178b, with each sealing member 174 including an angled portion for sealing against a respective valve seat and including a seal ring groove 173 and seal ring 175 retained therein for sealing against a respective side of web portion 179. A spring surface 180 is included on the bottom of valve stem 168 against which the biasing spring would impart an upward force to valve 166.

Valve 166 is shown in the upwardly biased orientation in FIG. 4, with the seal member 174 within upper annular groove 178a being biased for sealing against valve seat 200 such that fluid may flow in either direction between passages 192 and 218. Upon cam 30 imparting a downward biasing force to valve 166 via action of cam groove 58 on ball 182, valve 166 will be positioned such that lower seal member 174 within lower annular groove 178b seals against valve seat 216. In such an orientation fluid may flow in either direction between passages 106 and 218.

In like manner to valve assembly 20, valve assembly 120 may be manually actuated or electrically actuated, such as by way of a cable connected to a pin member or an electrical actuator having an activation button.

Referring now to FIG. 5, an alternative valve assembly 220 in accordance with the present invention is shown where valve assembly 220 is similar to valve assembly 20 discussed above, with like elements being shown in FIG. 5 with 200 added to the reference numerals of FIGS. 1-3. Due to the similarities, not all of the corresponding features or aspects of valve assembly 220 are discussed herein.

Valve assembly 220 includes multiple valves 266 that are caused to be moved by cam 230. In like manner to valve assembly 20, cam 230 may be either electrically actuated or manually actuated, such as by extending rack 238 by way of a cable connected to pin member 240 or by an activation button connected to motor 236 of actuator 234.

Figure 5:
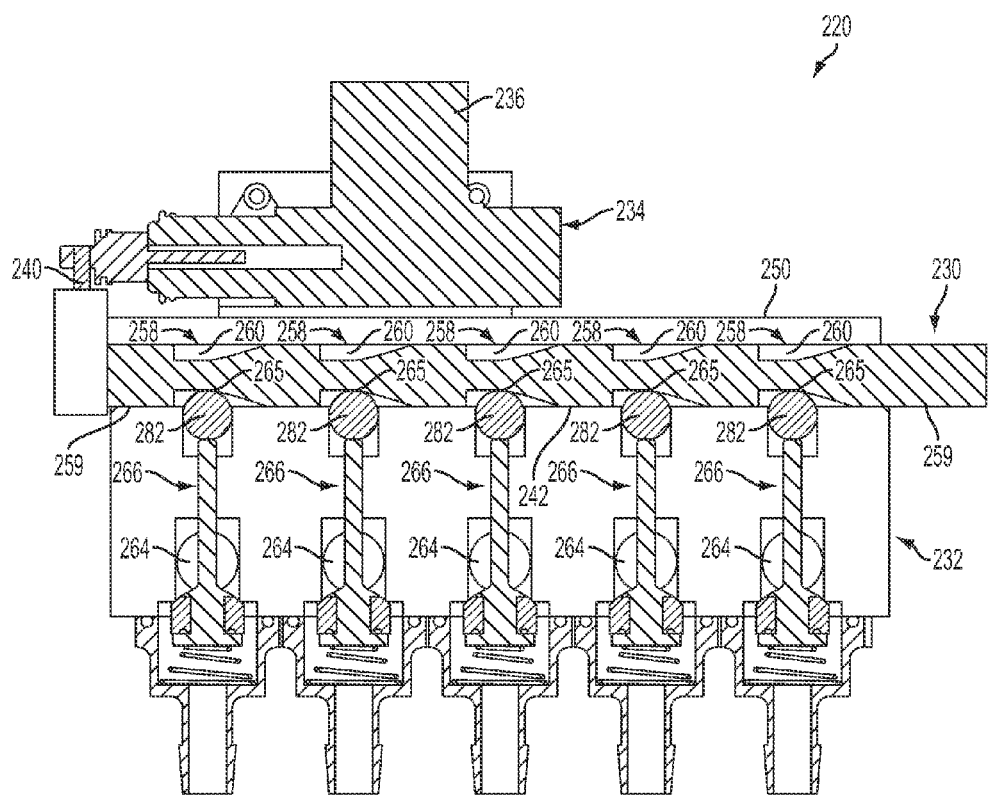
FIG. 5 is a side elevation cross sectional view of a cam actuated valve assembly with manual and electric activation in accordance with another aspect of the present invention.
Figure 5A:
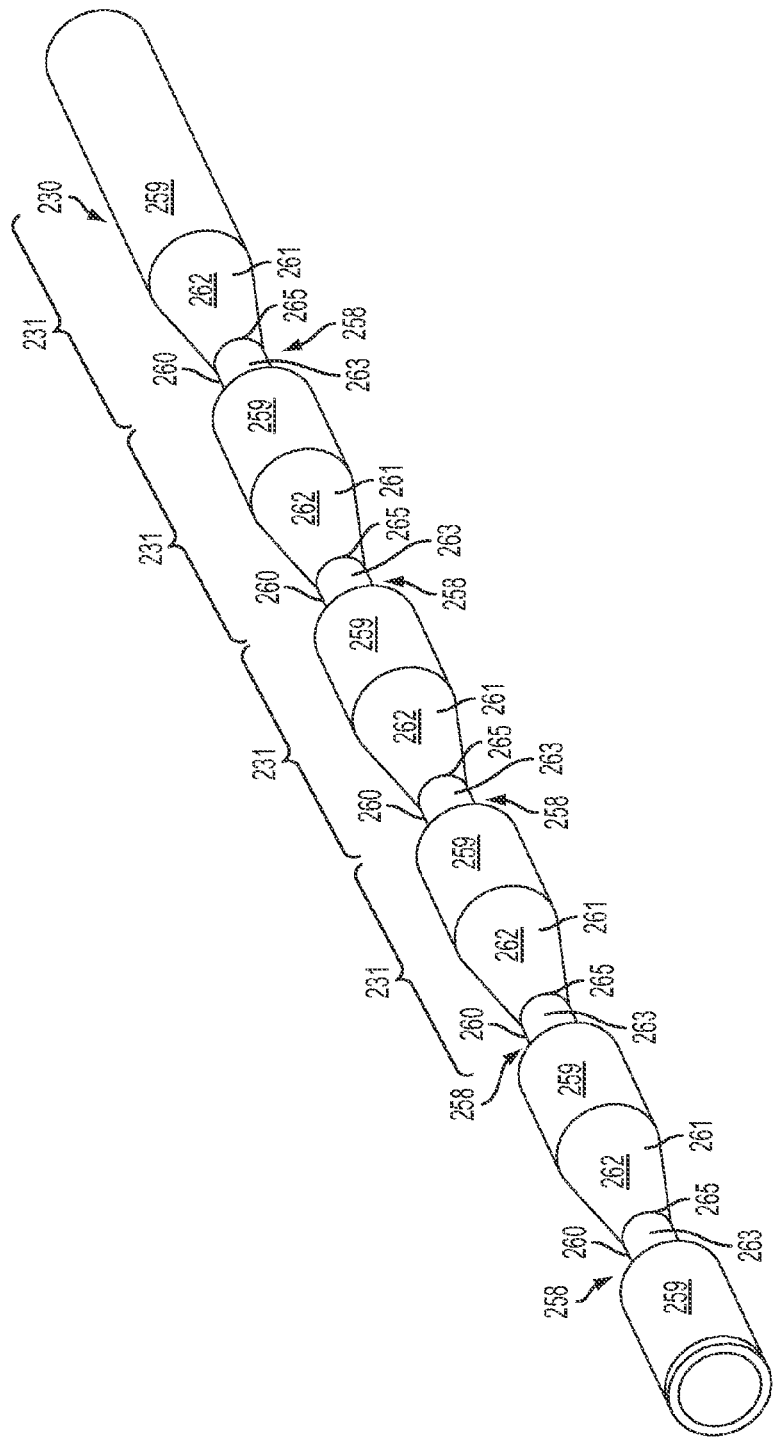
FIG. 5A is a perspective view of the cam from the valve assembly of FIG. 5.

As understood from FIGS. 5 and 5A, cam 230 comprises an elongate, generally cylindrical cam member having multiple, spaced cam grooves 258 that are formed as circumferential recesses 260 disposed about cam 230, with each cam groove 258 further including generally cone shaped portions 261 having angled cam surfaces 262. In particular, cam 230 comprises interconnected cam segments 231, with each segment including a first cylindrical portion 263 and a second cylindrical portion 259 separated by portions 261, where portions 261 thus have a generally frustum shape. Cylindrical portions 263 have a smaller diameter, which in combination with portions 261 define recesses 260. Cylindrical portions 259 have a larger diameter and, as discussed below, form bearing surfaces for movement of cam 230 within and relative to housing 232. The transition from portion 263 to portion 261 defines a valve activation location or transition portion 265.

As understood from FIG. 5, housing 232 includes a groove or channel 242 within which cam 230 slides for activation of valves 266, with the outer surface of portions 259 serving as bearing surfaces for cam 230. Channel 242 is cylindrical and may be formed by forming a semicircular channel in housing 232 and a corresponding semicircular channel in cover member 250 of housing 232, where the two semicircular channels mate to form channel 242. With actuating members 282 positioned within recesses 260 and cam 230 subsequently being moved to the left relative to the view shown in FIG. 5, members 282 will be acted upon by cam surfaces 262 of portions 261 to apply downward force on valves 266 and thereby open valves 266 to allow fluid, such as air, to escape from ports 264.

Referring now to FIG. 6 a cam 330 is disclosed that is similar to cam 30 and 230 discussed above, with like elements being shown in FIG. 6 with 300 added to the reference numerals of FIGS. 1-3. Due to the similarities, not all of the corresponding features or aspects of cam 330 are discussed herein.

Cam 330 includes multiple spaced cam grooves 358a, 358b, 358c, 358d, 358e with respective recesses 360a, 360b, 360c, 360d, 360e, along with corresponding first surfaces or portions 363a-363e and angled cam surfaces or ramps 362a-362e, respectively. The transitions from grooves 363a-363e to cam surfaces 362a-362e define valve activation locations or points 365a-365e, respectively, with cam 330 further including a bearing surface 359 for supporting sliding motion of cam 330 within a channel of a housing, such as channel 42 of housing 32.

Figure 6:
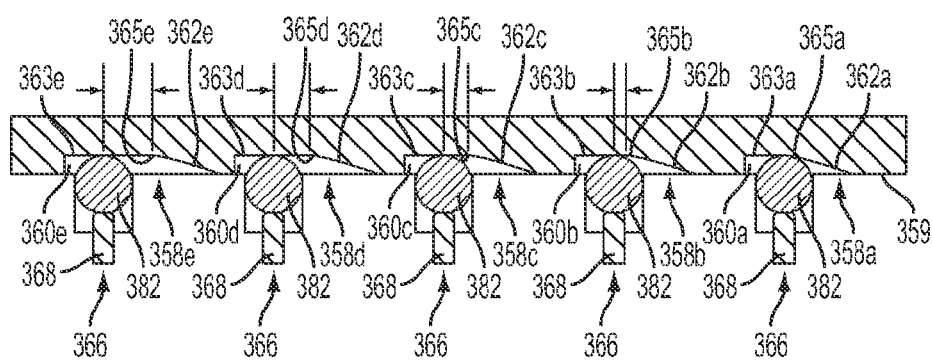
FIG. 6 is a partial side elevation cross sectional view of a cam, valves and valve housing of a valve assembly in accordance with an aspect of the present invention.

As understood from FIG. 6, the lateral position of valve activation locations 365a-365e relative to the vertical axis of valves 366 as defined by valve stems 368 are staggered relative to each other. As shown in the illustrated embodiment, for example, valve activation location 365a is approximately aligned with the vertical axis of its associated valve stem 368. In contrast, valve activation location 365b is slightly offset from the vertical axis of the associated valve stem 368, with each subsequent valve activation location 365c-365e having a slightly greater offset from the vertical axis of its respective valve stem 368 relative to the prior adjacent groove 358.

Accordingly, opening movement of cam 330 initially causes groove 358a to initiate opening of its associated valve 366 by way of ramp 362a acting on the ball 382 prior to any of the other valves 366 being opened. Subsequent continued motion of cam 330 would then cause groove 358b to initiate opening of its associated valve 366 by way of ramp 362b acting on the ball 382 prior to any of the valves aligned with grooves 358c-358d being opened. Correspondingly, continued opening movement of cam 330 would sequentially initiate opening of the valves 366 associated with grooves 358c, 358d and 358e, with the opening of each associated valve 366 not commencing until after opening of the valve associated with the prior groove has commenced. This valve-to-valve staggered opening initiation provides a smoother force profile during initial engagement of the valves 366, which in turn allows lower torque requirements for any actuator used for moving cam 330.

Although cam 330 is shown in FIG. 6 to have sequential staggering for the opening of each valve 366 relative to its adjacent valves, it should be appreciated that alternative staggering arrangements may be employed. For example, a cam may be constructed in which pairs of valves are opened simultaneously, with staggering between the various pairs of valves of the valve assembly. In addition, the degree to which a valve or valves are opened prior to the opening of a subsequent valve or valves may be altered, including by the cam ramp angle and/or the staggering distance between the valve activation locations relative to the vertical axis of the valves. The amount of staggering between valves 366 via the staggering of valve activation locations 365c-365e may also be quite small, whereby although the initiation of opening may be staggered, the valves 366 undergo opening movement simultaneously or nearly simultaneously for rapid deflation of the patient support mattress.

Although cam 330 is shown for use with five valves, it should be appreciated that alternative cams employing opening staggering may be utilized with valve assemblies having more than or less than five valves. Still further, although only a portion of cam 330 is illustrated, it should also be appreciated that the variable valve opening discussed with regard to cam 330 may be applied to cams having grooves on a single surface, such as cam 30 above, or to cams having circumferential grooved profiles, such as cam 330 above. In the case of a cylindrical cam such as cam 330, variable valve timing or staggering may be obtained by altering the lengths of cylindrical portions 263.

The valve assembly of the present invention provides a convenient dual-activation system for rapidly deflating a patient support mattress. Multiple valves within a unitary housing or separate housings may be either electrically or manually actuated by motion of a cam that acts on the valves, such as by way of cam ramps. The staggering of actuation locations on the camp ramps with respect to one other may be used to decreases the torque requirements of the electrical actuator used to move the cam. Actuating balls constrained within bores of the housing may be disposed between the cam and valves whereby the cam acts on the balls, which in turn act on the valves. The balls thereby promote the application of an axial opening force on the valves.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A valve assembly for a patient support mattress having a plurality of bladders, said valve assembly operable to selectively discharge fluid from the bladders of the patient support mattress and comprising:
   a plurality of valves, said valves being operatively connected with the bladders of the patient support system and selectively moveable between a closed position and an open position;
   a cam that selectively actuates said valves, said cam being moveable between a position in which fluid is sealed from discharge by said valves and a position in which said valves are in said open position; and
   an electrical actuator connected to said cam and a manual actuator connected to said cam, both said electrical actuator and said manual actuator being separately operable to move said cam to open said valves;

said cam including a plurality of cam surfaces with movement of said cam causing said cam surfaces to move relative to said valves to open said valves with said cam surfaces including an initial portion that commences opening of said valves, and with the spacing of said initial portion of one said cam surface relative to an associated said valve being different from the spacing of said initial portion of another said cam surface relative to its associated said valve whereby commencement of opening of all said valves does not occur simultaneously during movement of said cam.

2. The valve assembly of claim 1, wherein said valves include a valve stem and said cam slides generally perpendicular relative to said valve stem.

3. The valve assembly of claim 2, wherein said cam is generally cylindrical and comprises a plurality of cam segments for actuating said valves, said valve segments comprising a first cylindrical portion, a second cylindrical portion, and a cam surface portion located between said first cylindrical portion and said second cylindrical portion with said first cylindrical portion having a smaller diameter than said second cylindrical portion.

4. The valve assembly of claim 1, further including an actuating member disposed between said cam and each said valve, and wherein said cam surfaces act on said actuating members and said actuating members act on said valves.

5. The valve assembly of claim 4, wherein said actuating members comprise balls.

6. The valve assembly of claim 5, further including a housing within which said valves operate, and wherein said housing includes a plurality of actuator bores with said actuator bores retaining said actuating members.

7. The valve assembly of claim 6, wherein said housing comprises a plurality of housings with at least one said valve operating within each said housing.

8. The valve assembly of claim 1, further including a plurality of valve springs, said valve springs acting on said valves to maintain said valves in said closed orientation.

9. A valve assembly for a patient support mattress having a plurality of bladders, said valve assembly operable to selectively discharge fluid from the bladders of the patient support mattress and comprising:

a plurality of valves, said valves being operatively connected with the bladders of the patient support system and selectively moveable between a closed position and an open position;

a housing within which said valves operate;

a cam that selectively actuates said valves, said cam being moveable in a reciprocating orientation relative to said housing between a position in which fluid is sealed from discharge by said valves and a position in which said valves are in said open position; and an electrical actuator connected to said cam and a manual actuator connected to said cam, both said electrical actuator and said manual actuator being separately operable to move said cam to open said valves.

10. The valve assembly of claim 9, wherein said electrical actuator includes an extendable member with said extendable member being linked to said cam and with said extendable member sliding said cam to open said valves upon actuation, and wherein said manual actuator includes a cable linked to said cam with said cable being manually operable to slide said cam to open said valves.

11. The valve assembly of claim 9, wherein said cam includes a plurality of cam surfaces with movement of said cam causing said cam surfaces to move relative to said valves to open said valves with said cam surfaces including an initial portion that commences opening of said valves, and with the spacing of said initial portion of one said cam surface relative to an associated said valve being different from the spacing of said initial portion of another said cam surface relative to its associated said valve whereby commencement of opening of all said valves does not occur simultaneously during movement of said cam.

12. The valve assembly of claim 9, wherein said housing comprises a plurality of housings with at least one said valve operating within each said housing.

13. The valve assembly of claim 9, wherein said cam is generally cylindrical and comprises a plurality of cam segments for actuating said valves, said valve segments comprising a first cylindrical portion, a second cylindrical portion, and a cam surface portion located between said first cylindrical portion and said second cylindrical portion with said first cylindrical portion having a smaller diameter than said second cylindrical portion.

14. The valve assembly of claim 13, wherein said cam slides within a portion of said housing.

15. The valve assembly of claim 9, wherein said valves include a valve stem and said cam slides generally perpendicular relative to said valve stem.

16. The valve assembly of claim 9, further including an actuating member disposed between said cam and each said valve, and wherein said cam includes cam surfaces and wherein said cam surfaces act on said actuating members and said actuating members act on said valves.

17. The valve assembly of claim 16, wherein said actuating members comprise balls.

18. The valve assembly of claim 17, wherein said housing includes a plurality of actuator bores with said actuator bores retaining said actuating members.

19. The valve assembly of claim 9, further including a plurality of valve springs and a plurality of valve support members with said valve support members being affixed to said housing and said valve springs retained within said valve support members, said valve springs acting on said valves to provide a biasing force to maintain said valves in said closed position.

20. A valve assembly for a patient support mattress having a plurality of bladders, said valve assembly operable to selectively discharge fluid from the bladders of the patient support mattress and comprising:

a plurality of valves, said valves being operatively connected with the bladders of the patient support system and selectively moveable between a closed position and an open position;

a cam that selectively actuates said valves, said cam being moveable between a position in which fluid is sealed from discharge by said valves and a position in which said valves are in said open position; and an electrical actuator connected to said cam and a manual actuator connected to said cam, both said electrical actuator and said manual actuator being separately operable to move said cam to open said valves, with said electrical actuator including an extendable member that is linked to said cam to move said cam to open said valves upon actuation, and with said manual actuator including a cable linked to said cam with said cable being manually operable to move said cam to open said valves.

21. The valve assembly of claim 20 further including a housing within which said valves operate, and wherein said cam is moveable in a sliding orientation relative to said housing to open said valves with said cam including a plurality of cam surfaces and movement of said cam causes said cam surfaces to move relative to said valves to open said valves.

22. The valve assembly of claim 21, wherein with said cam surfaces include an initial portion that commences opening of said valves, and with the spacing of said initial portion of one said cam surface relative to an associated said valve being different from the spacing of said initial portion of another said cam surface relative to its associated said valve whereby commencement of opening of all said valves does not occur simultaneously during movement of said cam.

23. The valve assembly of claim 21, wherein said cam is generally cylindrical and comprises a plurality of cam segments for actuating said valves, said valve segments comprising a first cylindrical portion, a second cylindrical portion, with said cam surfaces located between said first cylindrical portion and said second cylindrical portion with said first cylindrical portion having a smaller diameter than said second cylindrical portion.

24. The valve assembly of claim 21, further including an actuating member disposed between said cam and each said valve, and wherein said cam surfaces act on said actuating members and said actuating members act on said valves.

25. The valve assembly of claim 24, wherein said actuating members comprise balls and said housing includes a plurality of actuator bores with said actuator bores retaining said actuating members.

26. The valve assembly of claim 21, further including a plurality of valve springs and a plurality of valve support members with said valve support members being affixed to said housing and said valve springs retained within said valve support members, said valve springs acting on said valves to provide a biasing force to maintain said valves in said closed position.

27. The valve assembly of claim 26, wherein said valve support members include a spring cavity and a spring seat, and wherein one of said springs is positioned within each said spring cavity with said spring being supported on said spring seat.

\* \* \* \* \*